United States Patent [19]

Saka et al.

[11] Patent Number: 5,434,792
[45] Date of Patent: Jul. 18, 1995

[54] VERSATILE PRODUCTION SYSTEM

[75] Inventors: Nobuo Saka, Kanazawa; Junichi Oda; Yasuaki Ishiyama, both of Kahoku, all of Japan

[73] Assignee: Fujitsu Limited, Kawasaki, Japan

[21] Appl. No.: 302,947

[22] Filed: Sep. 8, 1994

Related U.S. Application Data

[63] Continuation of Ser. No. 24,210, Feb. 23, 1993, abandoned.

[30] Foreign Application Priority Data

Oct. 28, 1992 [JP] Japan .................. 4-290314

[51] Int. Cl.$^6$ .................. G06F 19/00; G06F 17/60
[52] U.S. Cl. .................. 364/468; 364/478; 235/375
[58] Field of Search .............. 364/468, 478, 401, 402, 364/403, 474.11, 132, 138, 131, 133, 134; 235/375, 376, 385

[56] References Cited

U.S. PATENT DOCUMENTS

| | | | |
|---|---|---|---|
| 4,958,292 | 9/1990 | Kaneko et al. | 364/468 |
| 5,077,674 | 12/1991 | Tischler et al. | 364/468 |
| 5,086,397 | 2/1992 | Schuster et al. | 364/468 |
| 5,097,421 | 3/1992 | Maney et al. | 364/478 |
| 5,150,288 | 9/1992 | Imai et al. | 364/468 X |
| 5,166,874 | 11/1992 | Nomaru et al. | 364/468 X |
| 5,166,884 | 11/1992 | Maney et al. | 364/468 |
| 5,214,588 | 5/1993 | Kaneko et al. | 364/468 |
| 5,231,585 | 7/1993 | Kobayashi et al. | 364/468 |

OTHER PUBLICATIONS

H. Itoh and I. Sakamoto, "Special Edition: Total Production Information System–CIM–Commitment to CIM in PFU Kasajima Works," *Fujitsu Journal No. 197*, vol. 18, No. 4, 1992, pp. 60–69, (An English Language Translation is Attached).

*Primary Examiner*—Joseph Ruggiero
*Attorney, Agent, or Firm*—Staas & Halsey

[57] ABSTRACT

A versatile production system, to produce multiple kinds of products including small quantities of products, by supplying work order sheets to personnel in the line transmitted via a production management system, and by transmitting defective product data at each working process to a quality control system. The production system comprises assembling sites and testing sites for testing and inspecting the performance or the quality of an assembled product, at least one line terminal installed at each of the assembling sites and the testing sites, an ID card attached to a product to match the flow of an article and manufacturing data, including a type and a parts number for each product, while being transported, a line host controller that reads the data from the ID card via the line terminals, outputs work order sheets for operators via the line terminals, outputs a test result report containing test-inspection record data for each product, and outputs a delivery order sheet for preparation packing to a packing site via a Local Area Network, and a line host control terminal connected to the line host controller.

3 Claims, 6 Drawing Sheets

```
           LINE TERMINAL

EQUIPMENT  : OWS-D(3.5)
NAME
PRODUCT NO.: 50055
                                    PARTS
NO. UNIT-CD    UNIT NAME    NO.      LOT NO.  YR.MTH.
01  2500636    PWR115A      38812    02A       91 10
02  UOZE       CPU-110      IZ0120   05A
03  UOXJ       IFC-3C       IZ0287   01A

READ OUT OF BARCODE
                                 PF24 → K B
BARCODE 1
BARCODE 2

PF1 : COMPLETE    PF3 : DELETE
```

LINE TERMINAL DISPLAY

Fig.6

PACKING MATERIAL PREPARATION ORDER SHEET

NO.229  CUSTOMER    F9754A2    PACK MATERIAL   047/006-A         RECEIV. DATE       92.08.25
        EQUIP.CODE  06988      FOAM MATERIAL   047/006-B         RECEIV. TIME       18.01.57
        PACKING LINE 01        ATTACHED DRWGS  C10L-2020-B341    DELV. PARTS NO.    1340
                                                                 CONTROL NO.

NO.230  CUSTOMER    F9754BL2   PACK MATERIAL   047/006-A         RECEIV. DATE       92.08.25
        EQUIP. CODE 06318      FOAM MATERIAL   047/006-B         RECEIV. TIME       18.02.29
        PACKING LINE 01        ATTACHED DRWGS  C10L-2020-B344    DELV. PARTS NO.    1206
                                                                 CONTROL NO.

NO.231  CUSTOMER    F9754BL2   PACK MATERIAL   047/006-A         RECEIV. DATE       92.08.25
        EQUIP. CODE 06318      FOAM MATERIAL   047/006-B         RECEIV. TIME       18.03.12
        PACKING LINE 01        ATTACHED DRWGS  C10L-2020-B344    DELV. PARTS NO.    1202
                                                                 CONTROL NO.

VERSATILE PRODUCTION SYSTEM

This application is a continuation of application Ser. No. 08/024,210, filed Feb. 23, 1993, now abandoned.

BACKGROUND OF THE INVENTION

1. Field of the Invention

The present invention relates to a versatile production system; that is, a production system for manufacturing diverse items of products on a single line.

2. Description of the Prior Art

In general, a production line for products comprises a series of processes; that is, a process of supplying parts required for assembling a product, a process of assembling and manufacturing a product, a process of testing and inspecting the performance of an assembled product, and a process of feeding an accepted product to a packing site. It is preferable for mass production to install a production line for each product. When diverse item products are manufactured in small quantities, however, large factory space and a large number of production facilities are required. When products are manufactured in small quantities having a separate production line for each product, idling time increases, and sections of occupied factory space, production facilities, and operators become redundant.

Accordingly, a versatile production system for producing multiple kinds of products on a single line has been realized, which solves the above problems. When production volume must be dealt with flexibly and a required product must be manufactured in specific quantities, a work order sheet including information such as, the content of work, production sequence, supplied materials, and quality control for each product, etc. must be delivered to an operator stationed at respective workplaces. On receipt of the order, the operator must assemble, test and inspect a product, and compile a test result report. The operator must also record information pertaining to defective parts on a work sheet and feed back the information.

When multiple item products must be manufactured in small quantities, the foregoing versatile production system of a prior art poses problems such as: excessive time and labor is needed for processing information concerning the production line, an operator has an excessive amount of responsibility, operational errors may occur and production efficiency deteriorates.

SUMMARY OF THE INVENTION

The present invention attempts to solve the foregoing problems. The object of the present invention is to provide a versatile production system that is flexible and responds to a demand for manufacturing diverse item products in small quantities, automatically supplies a necessary work order to the operators working on a production line so that various kinds of products can be manufactured, automatically feeds back information about defective products, automatically creates a test result report, and solves the aforesaid problems.

Figure 1:
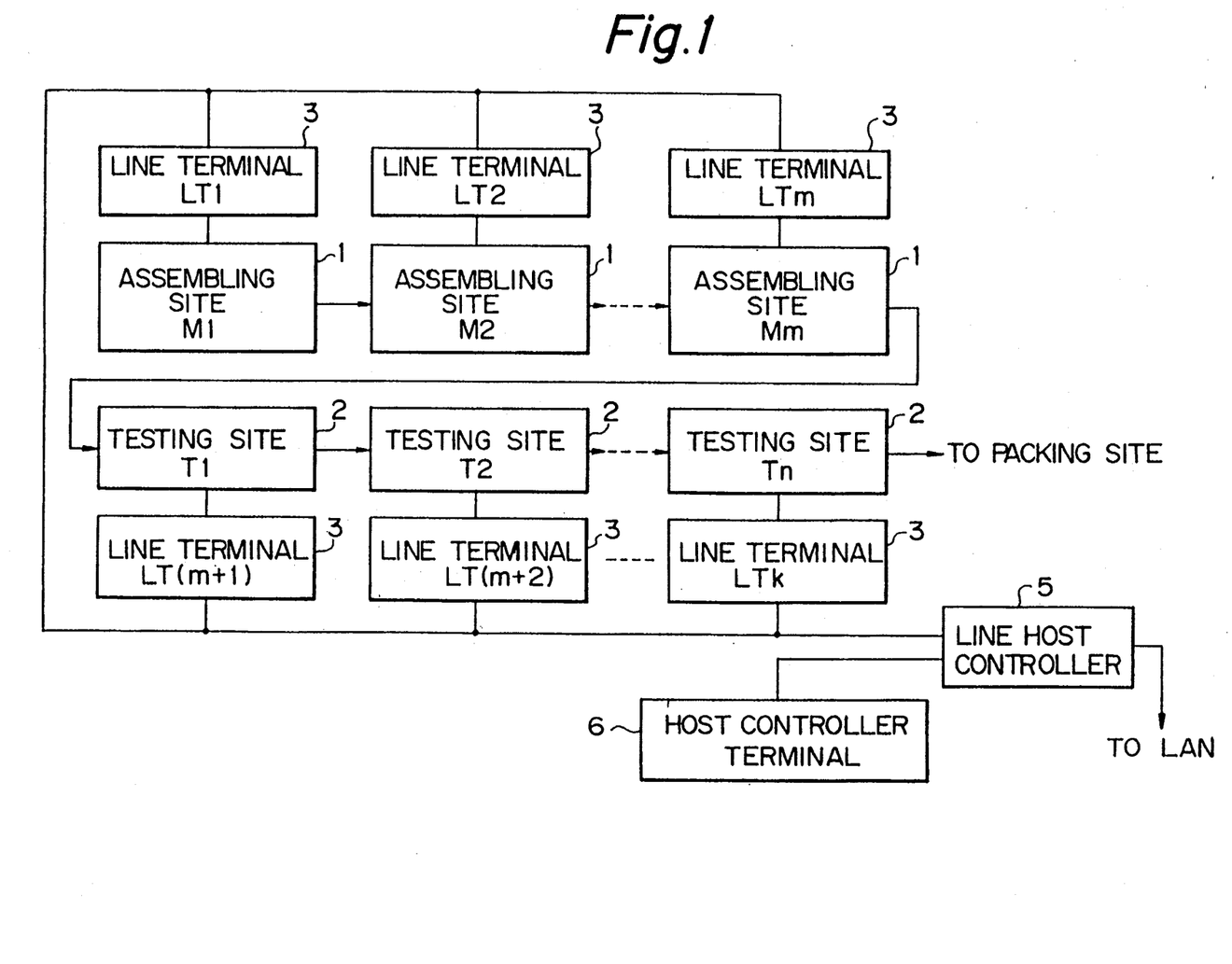
FIG. 1 is a basic construction drawing of a versatile production system of the present invention.

FIG. 1 is a basic construction drawing of a versatile production system of the present invention. The versatile production system of the present invention, which achieves the object, assembles multiple kinds of products individually on a single production line, tests and inspects and transports said products to a packing site, comprising:

(1) assembling sites 1 for assembling multiple parts that are delivered in the order in which they are assembled and that make up a single product;

(2) testing sites 2 for testing and inspecting the performance and quality of an assembled product, and transporting a product determined as defective to a retiring site or transporting a product determined as non-defective to a packing site;

(3) a plurality of main line terminals 3 that are installed in the assembly sites 1 and testing sites 2;

(4) an ID card that is attached to a product or a pallet for loading a product so as to match the flow of an article and relevant information, and that read and write at the assembling sites 1 or testing sites 2 the manufacturing data including a type and a parts number for each product while being transported;

(5) a line host controller 5 that reads data from the ID card 4 via the main line terminals 3 installed in the workplaces of the assembly sites 1 and testing sites 2, that uses the read data to output work order sheets for operators working at the assembly sites 1 and testing sites 2 via the main line terminals 3, that outputs a test result report containing test/inspection record data for a product that has been assembled, tested and inspected, and finally determined as non-defective via a line terminal installed at a final testing site that is connected over a LAN to a packing site host controller installed at a packing site, and that outputs a delivery order sheet that relates to products being delivered and assists in preparations for packing via a control terminal of the packing site host controller; and (6) a line host control terminal 6 that directly inputs or outputs the data relating to production management and quality control and including master file maintenance, work order control, progress control, schedule arrangement, and product history control from or to the main line host controller 5.

A versatile production system of the present invention is characterized in that the line host controller 5 is electrically connected to a production management system via the Local Area Network; the production management system permits control of semi-assembled products being processed, test start times, test end times, packing states, and faulty machinery, and supervises the condition of all goods being processed and controls the progress of production in the line.

A versatile production system of the present invention is characterized in that the line host controller 5 is electrically connected to a quality control system via the Local Area Network; the quality control system statistically processes product defect information, and feedbacks said defective product information to a repair site or a unit maker of the defective products.

The operation of a versatile production system that achieves the object of the present invention will be described. A line host controller 5 reads data written in an ID card 4, which is transported to assembling sites 1 and testing sites 2 via line terminals 3. Using the read data, the line host controller 5 instructs the operators at the assembling sites 1 and testing sites 2 to output work orders so as to display units via the line terminals 3. The line host controller 5 then outputs a test result sheet containing test/inspection record data on a product that has been assembled, tested, inspected and finally determined as non-defective via a printer of the line terminal installed at a final testing site. Furthermore, the line host controller 5 outputs a delivery order sheet that relates to products being delivered and assists in preparations for packing, by a printer of a control terminal connected via a LAN to a packing site host controller at a packing workplace, at which products are packed. The line host controller 5 communicates progress information via a production management system, and information on faulty units via a quality control information control system.

DETAILED DESCRIPTION OF THE PREFERRED EMBODIMENTS

Figure 2:
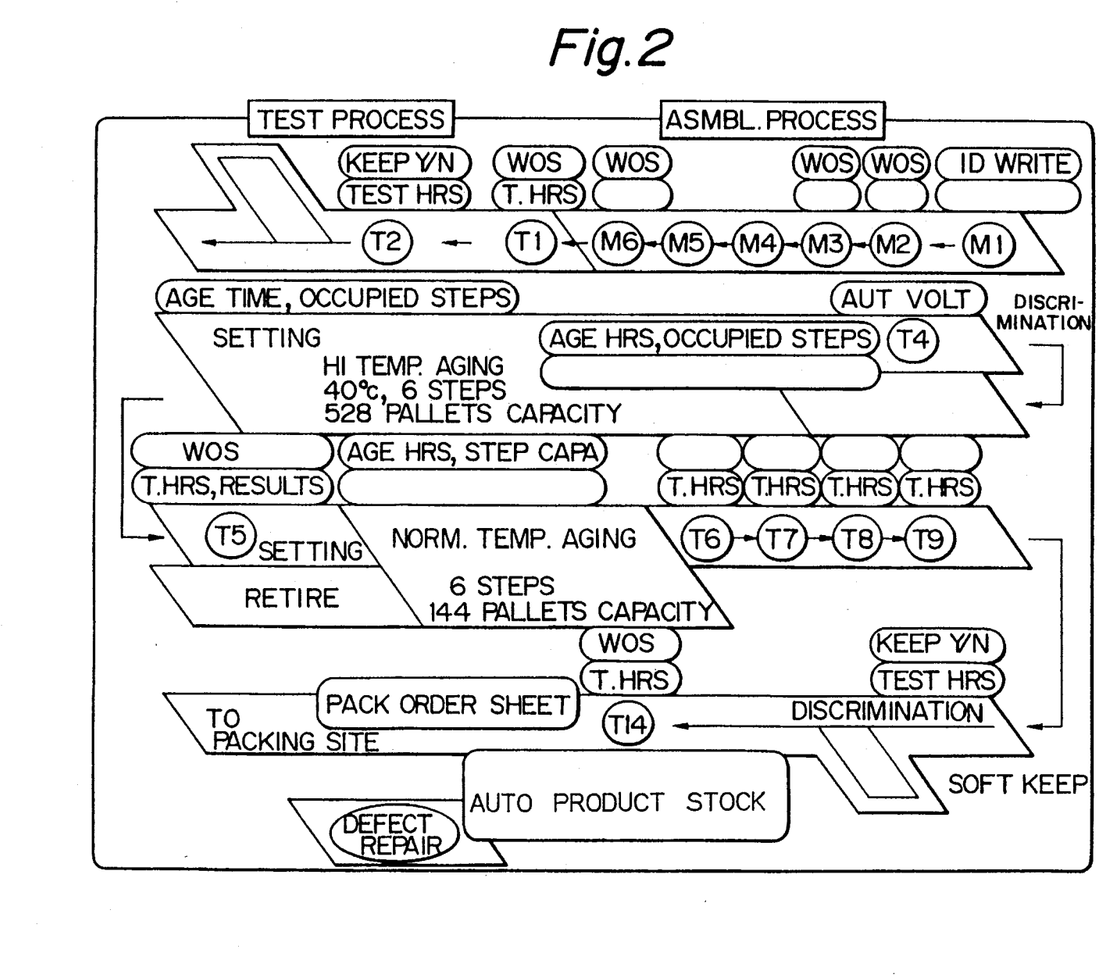
FIG. 2 shows an embodiment of a versatile production system of the present invention.

FIG. 2 shows an embodiment of a versatile production system of the present invention. In FIG. 2, M1 to M6 denote assembly sites for assembling products. T1 to T14 denote testing sites for testing and inspecting semi-assembled products. A semi-assembled product implies an integrated body of parts making up a product, which is then transported during the assembling process, from assembly to completion of assembly, to the first testing site T1. In the assembling sites M1 to M6, semi-assembled products 1 to 6 are assembled. The assembling sites M1 to M6 include temporary parts supply stations (not shown), in which parts required for the type of product are stored. Trolleys are used to distribute parts, each of which distributes parts to the assembling sites M1 to M6 in the order in which the parts are assembled. Some assembling sites may not be used depending on the number of parts. In this embodiment, an ID card (not shown) serving as a communication-memory unit or a data carrier is attached to a pallet for loading a product. The ID card is used to transfer information necessary for manufacturing products to or from a line host controller via line terminals.

Figure 3:
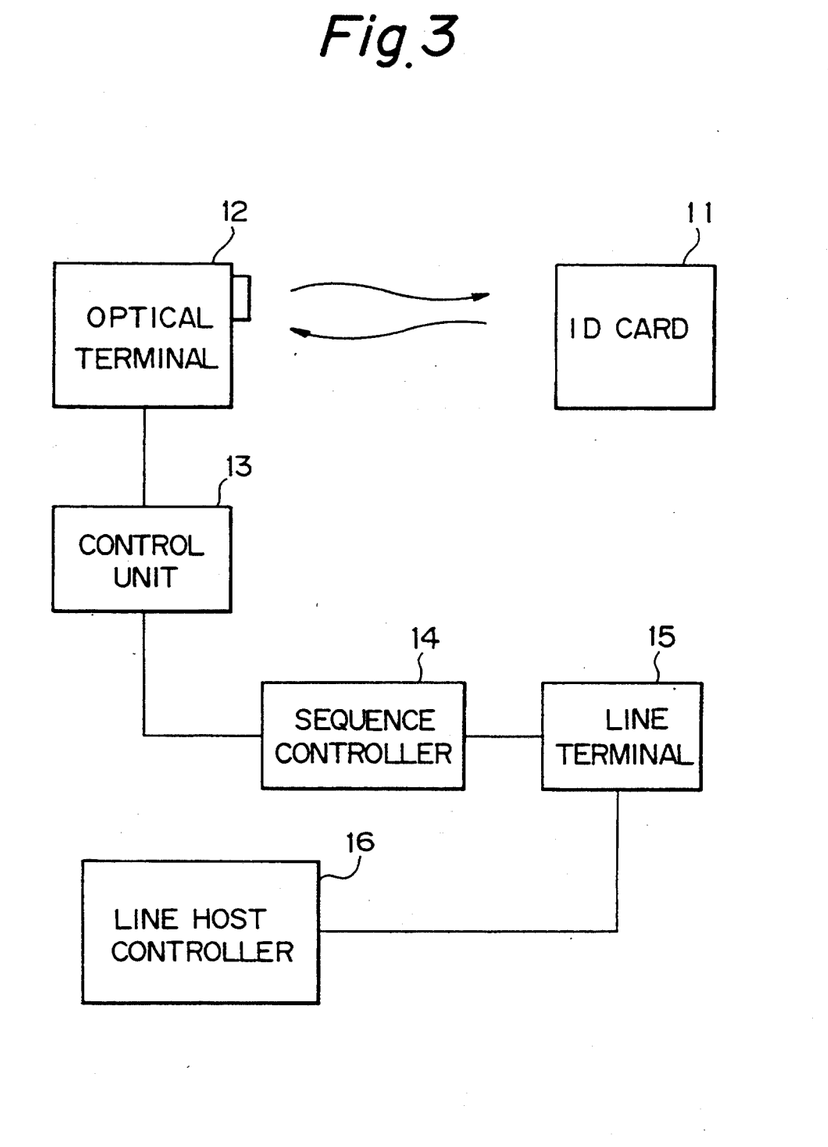
FIG. 3 shows hardware for linking between an ID card and a line host controller.

FIG. 3 shows hardware for linking between an ID card and a line host controller, In FIG. 3, a numeral 11 denotes what is referred to as an optical ID unit or an ID card in the present invention. The ID card 11 is attached to a product or a pallet for loading a product, and an optical terminal 12 is installed in each assembling site or each testing site. When the ID card arrives, a photoelectric switch installed in each assembling or testing site detects the presence of the ID card and a sequencer 14 stops a conveyor belt, which is not shown. The assembling or testing is then started. Beforehand, the ID card 11 is communicated via the optical terminal 12 to read or write data therefrom or thereon. Reading or writing data is effected by a line terminal 15 in each workplace under the control of a line host controller 16. A signal transferred via the optical terminal 12 is amplified by a control unit 13. The control unit 13 is connected through the sequencer 14 or directly to the line terminal 15 using an RS-232C interface.

A line terminal in an assembling site M1 transmits a products code corresponding to a product type that has been entered by a keyboard or by reading a bar code to a line host controller. The line host controller writes data for an ID card, such as, a products code, a control number, a process number, a work start time, a work end time, and test patterns that are stored therein, on an ID card to be described later via a semi-assembled product handling terminal. The line host controller then informs an operator of the data for an ID card by outputting an assembling work order sheet to a CRT monitor or printer connected to the semi-assembled product handling terminal. The operator in the assembling site M1 starts driving a transporting means or a conveyor belt (not shown) so as to transport an assembled product according to the work order sheet.

At assembling sites M2 to M6, semi-assembled product terminals or line terminals installed therein read the product code, control number, and other data from the ID card attached to the pallet transported sequentially to the workplaces. The semi-assembled product terminals also read data pertaining to the type, part numbers, lot numbers, and the manufacturing dates of the parts making up the semi-assembled product, for example, from the bar codes attached to the parts. The semi-assembled product terminals then transmit the read data to the line host controller. The line host controller informs operators of the above data by outputting the assembly work order sheets associated with the assembling sites M2 to M6, which will be stored in the line host controller, to CRT monitors or printers connected to the respective semi-assembled product terminals. The operators start driving transporting means or conveyor belts (not shown) to feed semi-assembled products 1 to 6, which are being assembled, to the assembling sites at the subsequent steps. Finally, the semi-assembled product 6 is transported to a testing site T1.

A testing terminal or a line terminal in the testing site T1 reads the products code and the control number from the ID card attached to the transported pallet and identifies the type, part numbers, lot numbers, and manufacturing dates of the parts making up the product by reading, for example, bar codes attached to the parts. The testing terminal then transmits these data to the line host controller. The line host controller determines whether any part is missing from the semi-assembled product 6, then issues a work order indicating, for example, Missing Part Found to a CRT monitor or a printer connected to the testing terminal, thus informing the operator. Moreover, the testing terminal writes the data acquired in the testing site T1, which includes a process number, a work start time, a work end time, and the results of determination indicating the presence or absence of a defect, on the ID card. The operator then starts driving a transporting means or a conveyor belt (not shown) to feed the semi-assembled product 6 to a testing site T2.

A line terminal in the testing site T2 reads the data of products code and the control number from the ID card attached to the transported pallet, then transmits these data to the line host controller. The line host controller checks and determines whether Software Keep should be executed; that is, if a test program should be written in the hard disk of the product, and then informs an operator of the results of the check by outputting the result to a CRT monitor or a printer connected to the line terminal. When it is determined that Software Keep should not be executed, the operator starts transporting the semi-assembled product to a testing site T3 at the next step, and when it is determined that Software Keep should be executed, the operator temporarily places the semi-assembled product on a Software Keep shelf, writes a test program on the hard disk of the product, and starts transporting the semi-assembled product to the testing site T3 at the next step.

A line terminal at the testing site T3 reads the data of products code and the control number from the ID card attached to the transported pallet, and then transmits the read data to the line host controller. The line host controller checks to determine if the semi-assembled product 6 should be retired (i.e. subjected, as a returned article, to a repairing process), then informs an operator of the result of the check by outputting same to a CRT monitor or a printer connected to the line terminal. When it is determined that the semi-assembled product should be retired, the operator places the semi-assembled product 6 at a retiring site. When it is determined that the semi-assembled product should not be retired, the operator checks a setting order indicating the conditions for setting high-temperature aging and low-temperature aging apparatuses, then sets the aging apparatuses according to the setting order. In the setting, the operator sets the aging time, relative to a set aging voltage to, for example, two hours at a voltage L (a little lower than 5 V) or twelve hours at a voltage VH (a little higher than 5 V), and specifies the number of steps occupied by each aging apparatus that depends on the size, or especially, the height of a semi-assembled product. The operator then starts driving a transporting means inside the high-temperature aging apparatus toward a testing site T4 at the next step.

The number of occupied steps is set to six for each of the high-temperature aging and normal-temperature aging apparatuses. A transporting means covering six steps is installed, and depending on the height of a semi-assembled product, two or three steps are occupied for each semi-assembled product. The high-temperature aging apparatus consists of transporting means for outgoing and incoming paths. The normal-temperature aging apparatus includes a transporting means for an outgoing path alone. A retiring site is preserved not only in testing site T3 but also in testing sites T4, T5, T7, and T14.

A line terminal in the testing site T4, which situated outside the outgoing path of the high-5 temperature aging apparatus, reads the data of the products code and the control number from the ID card attached to the transported pallet, and then transports the read data to the line host controller. The line host controller outputs the received data to a CRT monitor or a printer connected to the line terminal, thus reporting whether or not the semi-assembled product 6 has an automatic voltage change function, and when the semi-assembled product 6 has said function, the operator does not respond and when the semi-assembled product 6 does not have said function the operator modifies the set voltage value manually. The operator then starts driving a transporting means in the high-temperature aging apparatus to transport the semi-assembled product 6 through the outgoing path of the high-temperature aging apparatus toward a testing site 5 at the next step.

A line terminal in the testing site T5, which is situated outside the outgoing path of the high-temperature aging apparatus, reads the data of the products code and the control number from the ID card attached to the transported pallet, and then transmits the read data to the line host controller. The line host controller outputs the aging time for the normal-temperature (room-temperature) aging apparatus and the number of occupied steps for the semi-assembled product to a CRT monitor or a printer connected to the line terminal, thus informing an operator of the data. The operator sets the aging time for the normal-temperature aging apparatus and the number of occupied steps as informed, and then starts driving a transporting means in the normal-aging apparatus.

After normal-temperature aging is completed, the semi-assembled product is transported to a testing site T10. A line terminal in the testing site T10 reads the data of the products code and the control number from the ID card attached to the transported pallet, and then transports the read data to the line host controller. The line host controller outputs the received data to a CRT monitor or a printer connected to the line terminal, thus informing an operator whether Software Keep should be executed; that is, whether an operating system should be written. When Software Keep should be executed, the operator executes a write operation, and following that, the operator starts driving a transporting means to a packing site toward a testing site T14. When Software Keep should not be executed, the operator starts driving the transporting means without Software Keep.

A line terminal in the testing site T14 reads the data of the products code and the control number from the ID card attached to the transported pallet, and then transmits the read data to the line host controller. The line host controller issues a test result report to a printer connected to the line terminal at the testing site T14. Moreover, the line host controller executes Stocking After Testing; in other words, the line host controller reports the completion of assembly and inspection to a production management system. Furthermore, the line host controller communicates via a packing site host controller at a packing site over LAN, and informs an operator of a packing work order indicating that a cardboard box required for packing should be prepared to transport a semi-assembled product to the packing place by outputting the packing work order to a printer or a CRT monitor connected to the administration terminal of the packing site host controller. On the other hand, the line terminal in the testing site T14 writes the data acquired in the testing site T14, which includes a process number, a work start time, a work end time, and the results of a determination representing the presence or absence of a defect, on the ID card. Finally, the operator starts driving a transporting means or a conveyor belt (not shown) so as to feed the product to the packing site.

The features of the versatile production system in conjunction with an embodiment will be described. The first feature is that individual units of product manufacturing information can be controlled using ID cards.

Figure 4:
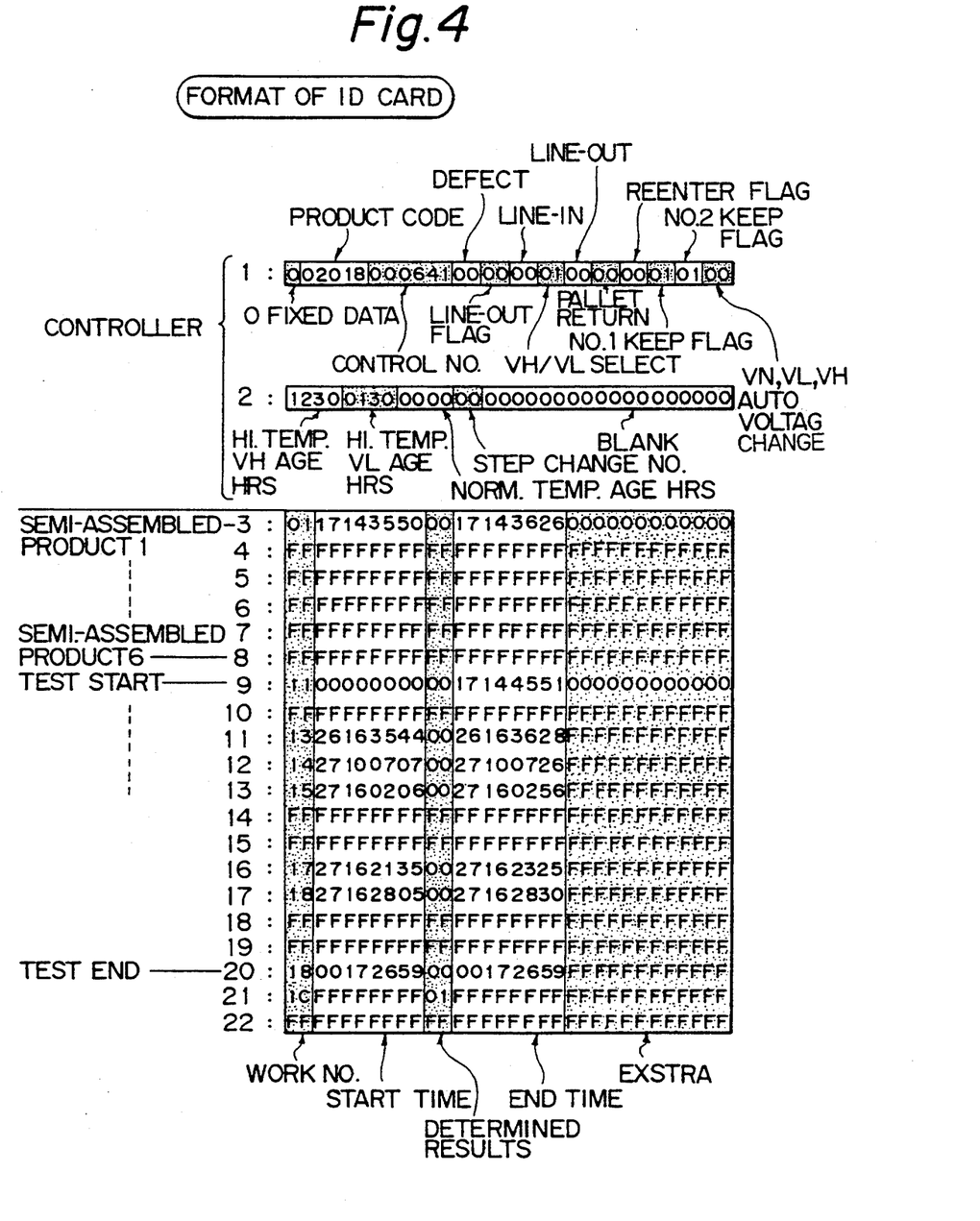
FIG. 4 shows a format of an ID card.

FIG. 4 shows a format of an ID card. An ID card employed in the embodiment has a storage capacity of 2K bytes as shown in FIG. 4. A 32-byte memory area (herein, one byte consists of four bits) is allocated to each of the 22 addresses. In this memory map, data stored at address 1 are fixed data, a products code, a control number, data indicating the presence or absence of a defect, a line-out flag, a line-in flag, selection of VH or VL, Line-out Process, Pallet Return, a re-entry flag, a No.1 Keep flag, a No.2- Keep flag, and Automatic Voltage Change of VN, VL, and VH. Data stored at address 2 are a high-temperature VH aging time, a high-temperature VL aging time, a normal-temperature aging time, Step Change, and supplementary data related to line control. Data stored at addresses 3 to 8 are the process numbers, start times, the results of determination, end times, and supplementary data of semi-assembled products 1 (assembling site M1) to semi-assembled products 6 (assembling site M6). Data stored at addresses 9 to 10 are process numbers, start times, the results of determination, end times, and supplementary data of semi-assembled products from the beginning of the test process (at a testing site T1) to the end of the test process (at a testing site T14).

The contents of the memory will be described as a supplement. Fixed data represents a leading address of a memory area and is set to 0. The products code and the control number indicate a product type and a parts number respectively. The presence or absence of a defect indicates whether or not a part is missing or an abnormality is found in the results of a test. The line-out flag provides identification data indicating that a product should be neither assembled nor tested until a product, in which a defect is detected, reaches the first retiring space. The line-in flag specifies re-entry; that is, provides data indicating whether or not product is retired, or in which process a retiring order is issued. For example, 00 represents No Retired Product. 01 represents Retire Order issued in Process 1. Selection of VH or VL indicates whether VH or VL is set to an automatic power change unit installed at a testing site T4. Line-out Process indicates a process in which a product is retired. Pallet Return is data indicating whether a pallet should be returned to a leading process by passing through or bypassing the high-temperature aging apparatus. The re-entry flag specifies whether or not the product is a re-entered article. The No.1 Keep flag specified whether or not to load a test program. The No.2 Keep flag specifies whether or not to load an operating system on a hard disk. Automatic voltage Change of VN, VL, and VH indicates whether a product has an automatic voltage change function.

The high-temperature VH aging time, high-temperature VL aging time, and normal-temperature aging time, which reside at address 2, are provided, for example, as data 1230, meaning that aging continues for twelve and a half hours. Step Change indicates the selection of one step, two steps, or three steps. The process numbers residing at addresses 3 to 22 are concerned with assembling sites M1 to M6 or testing sites T1 to T14. The start time or end time is written in the form of a date, hours, minutes, and seconds. The results of the determination indicate the presence or absence of a defect.

As described above, an ID card stores data of each product. As a semi-assembled product is transported over a production line, the ID card is read and written at assembling and testing sites. Based on these data, up-to-date and accurate work orders are issued. Communication with a quality information system and a production management system enables the common use of data and offers support to quality control and production management systems.

The second feature is that a product history can be controlled automatically.

As part of the serving line operations, the versatile production system checks the compatibility of a product number and the lot number for each of the mounted component parts; such as, a printed circuit board unit, the power supply, a floppy disk unit, and a magnetic disk unit, which make up the component parts of an office computer. The line operators can view said parts on monitor screens.

Figure 5:
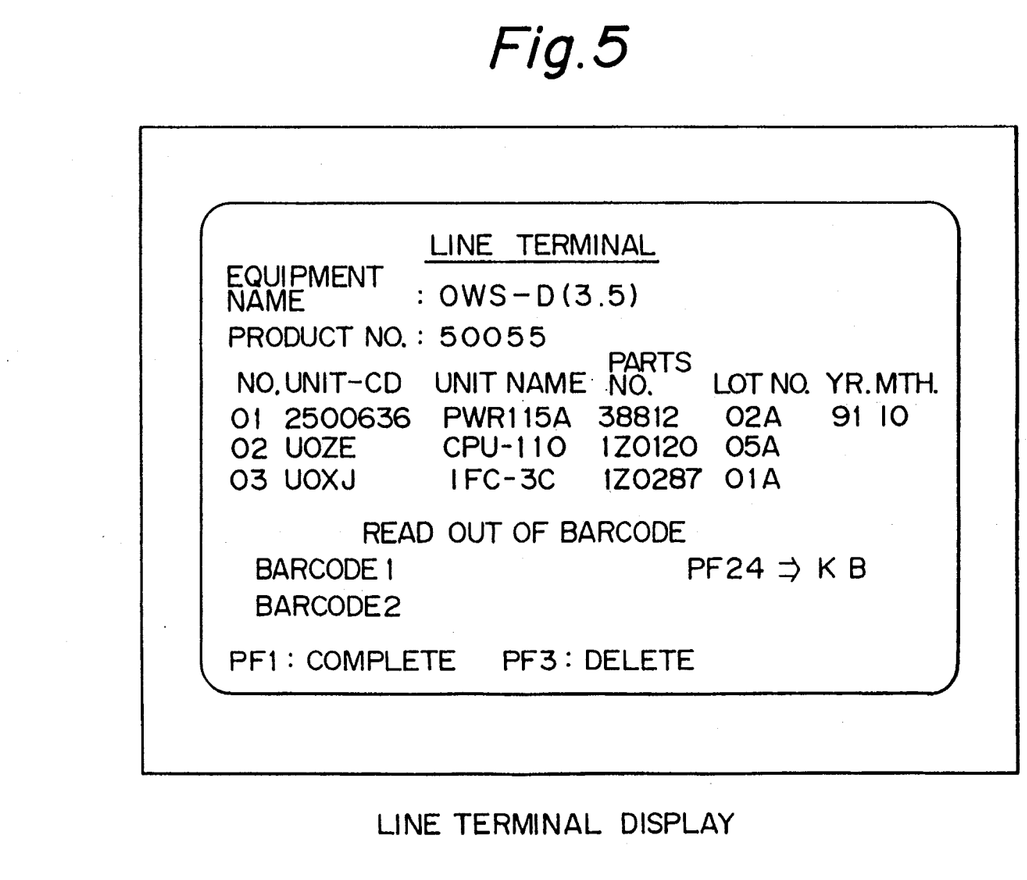
FIG. 5 shows an example of a display screen of a line terminal in an assembling site.

FIG. 5 shows an example of a display screen of a line terminal at an assembling site. In FIG. 5, the equipment name corresponds to the product code, and the product number corresponds to the control number. The table lists a product number, a unit CD, a unit (part) name, a parts number, a lot number, and a manufacturing data for each of the parts mounted to the product.

The product history is controlled by entering a bar code attached to each of the mounted parts to the versatile production system in each of the semi-assembly processes. The data concerning the mounted parts are stored as mounted information in the versatile production system (product history data master file), and used to automatically print a test result report when work is completed. Support for these functions relieves an operator from having to fill out a check sheet, a work order sheet attached to a printed circuit board, and a test result report, and with the product history data master file, a product code or the shipping time of a product can be retrieved by referencing a lot number or a parts number, or retrieval can be effected by specifying a product code, which reinforces the interchangeability of data.

The third feature is that the progress of particular processes or particular goods being processed can be supervised.

In the past, the progress of processes has been supervised by a production management system, whereby the production management system controls only parts supply orders and reports on products stocked following testing. Therefore, control of the progress of a process or goods being processed was the responsibility of the staff in the field. If a defect occurred, it would take an excessive amount of time to retrieve goods being processed. The introduction of the versatile production system of the present invention permits the control of semi-assembled products being processed, test start times, test end times, packing states, and faulty machinery in the line. This enables the supervision of all goods being processed. Moreover, a progress control function can be realized, and the number of semi-assembled products, units under testing and the units that have been tested can be determined, and the progress can be displayed relative to the scheduled number of units tested on that day.

The fourth feature is that detailed defect information can be controlled.

Detailed defect data are registered in and controlled by a quality information system. A database of detailed defect information is then constructed to ensure a supply of detect information to an operator or the issuance of a work order to an operator. Information pertaining to a faulty machine is transferred to a file in a factory quality information system (FOCUS). Thereby, required information can be supplied to a repair process, which is independent of the versatile production system, in order to process defect information statistically or resolve a defect. Moreover, the information pertaining to a defect can be fed back to a unit maker concerned.

The fifth feature is that automatic stocking can be effected.

On a versatile production line, in the final test process, completion data is read automatically from an ID card. The completion data is then collated with planned test completion data existent in a production management system. A test completion result is then compiled and transmitted to the production management system. The planned test completion data fetched from a database in the production management system is transferred to a line host controller on the versatile production line, and then collated with the acquired test completion data in the test completion process. The database in the production management system is then updated as test completion result data, which enables automatic stocking without using slips.

The sixth feature is that centralized packing support processing can be done.

A centralized packing system for packing major products at a single site has been adopted to facilitate packing efficiency and realize consistent versatile production from assembling steps through testing and packing.

A centralized packing support system communicates with line host controllers on multiple versatile production lines on different floors over LAN using a packing site control host controller thereof. The centralized packing support system then reports product information (type and parts number) acquired at the completion of tests undertaken on the versatile production lines on the different floors to the packing site floor. The running state of each production line can be supervised on the packing site floor, and based on this information and packing material master data, a packing material delivery order sheet, shown in FIG. 6, is issued, which enables timely supply of packing materials to a packing operator.

Figure 6:
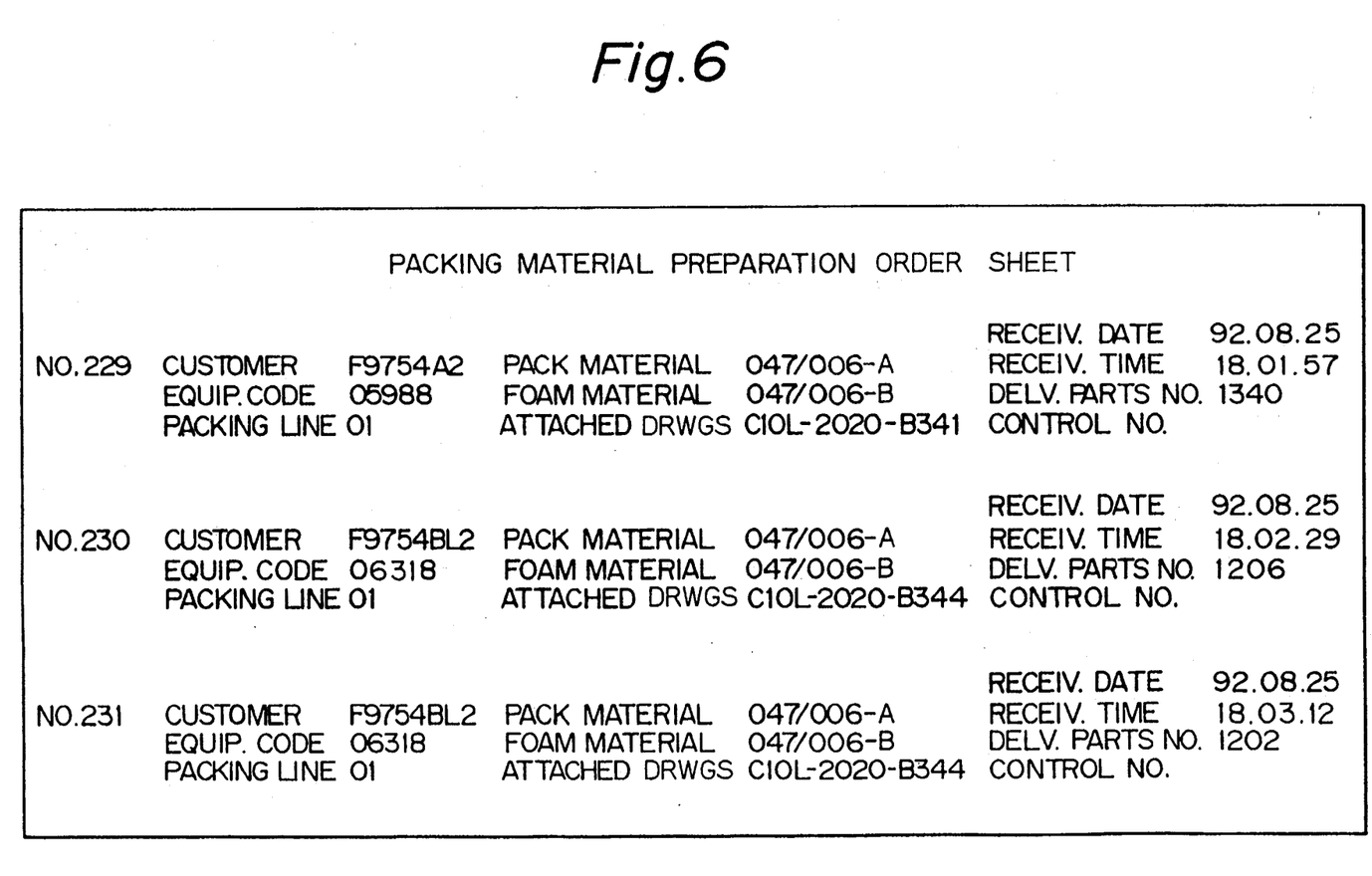
FIG. 6 shows an example of a packing material preparation order sheet.

FIG. 6 shows an example of a packing material preparation order sheet which by viewing this order sheet, an operator at a packing site can identify the size of a cardboard box required for packing and the size of the foaming material operation manual attached thereto, and makes preparations for packing before a product arrives at the packing sites.

As described so far, according to a versatile production system of the present invention, the product code, control number, and the names of the parts of a product to be assembled and tested can be imparted to an operator using a display unit or the like. Based on the data on an ID card, control of a versatile production line, determination of whether to write software on a product, control of aging time, or determination of whether to retire a faulty product is imparted by issuing a work order, which ensures a versatile production line that manufactures various products efficiently using a single line.

Furthermore, the properties of goods in process occurring at steps after delivery from a parts stock room to distribution to a product stock room is reduced and the man-hours required for assembling and testing is reduced significantly. Space efficiency in a factory is improved, product quality and reliability is also upgraded, and the required amount of equipment investment is reduced. All of these factors contribute to greatly improve the productivity of a production line system. The effective use of the properties of databases enables automated control of a products history or automated information retrieval of, for example, defect information. Over LAN, line host controllers of a versatile production system, which are installed on different floors, can communicate with a centralized packing support system. The versatile production system and centralized packing support system can share up-to-date data necessary for packing. Furthermore, the versatile production system can apply to production management or quality control owing to the capacity for communicating with a production management system or quality information system.

We claim:

1. A versatile production system for assembling, testing, inspecting, and transporting multiple kinds of products assembled individually on a single production line, comprising:
   a plurality of assembling sites each for assembling a respective one of a plurality of parts into an assembled product, said parts being distributed to said assembling sites in the order in which said parts are assembled and said parts making up a single product;
   a plurality of testing sites for testing and inspecting at least one of performance and quality of the assembled product to determine whether said assembled product is defective, and if said assembled product is determined to be defective, for transporting said defective assembled product to a retiring site and if said assembled product is determined not to be defective, for transporting said non-defective assembled product to a packing site;
   at least one line terminal installed in each of said assembling sites and each of said testing sites;
   an ID card attached to each of a plurality of products to be assembled to match the production flow of said products and information therewith, and to read and write at said assembling sites and said testing sites manufacturing data including a type and a parts number for each of said products while being transported;
   a line host controller to read said manufacturing data from said ID card via said line terminals installed in workplaces of said assembling sites and said testing sites, to use said read data to supply order sheets for operators working at said assembling sites and said testing sites via said line terminals, to supply a test result report including test-inspection record data for said assembled product assembled by said assembling sites and tested, inspected and finally determined as non-defective by said testing sites via a line terminal installed in a final one of said testing sites, to output a delivery order sheet relating to a product to be delivered, and to assist in making preparations for packing via a control terminal of a packing site host controller, said line host controller being connected to said packing site host controller installed in a packing site for packing said product over a Local Area Network; and
   a line host control terminal to directly input and output data, said data relating to production management and quality control including master file maintenance, work order control, progress control, schedule arrangement, and product history control, to and from, respectively, said line host controller.

2. A versatile production system as claimed in claim 1, wherein said line host controller is electrically connected to a production management system via said Local Area Network, and said production management system monitors semi-assembled products being assembled by said assembling sites, tests start and end times at said testing sites, packing states and faulty machines in said production line, supervises the condition of all products being semi-assembled or semi-tested, and controls the progress of production in said production line.

3. A versatile production system as claimed in claim 1, wherein said line host controller is electrically connected to a quality control system via said Local Area Network, and said quality control system statistically processes product defect information at at least one of said testing sites and said assembling sites to provide feedback information of said defective products to a repair site for repairing said defective products.

* * * * *

UNITED STATES PATENT AND TRADEMARK OFFICE
CERTIFICATE OF CORRECTION

PATENT NO. : 5,434,792
DATED : July 18, 1995
INVENTOR(S) : Nobuo Saka et al.

It is certified that error appears in the above-indentified patent and that said Letters Patent is hereby corrected as shown below:

TITLE PAGE [73] ASSIGNEE

"Fujitsu Limited, Kawasaki, Japan" should be --PFU Limited, Ishikawa, Japan--.

Signed and Sealed this

Second Day of January, 1996

Attest:

BRUCE LEHMAN

Attesting Officer

Commissioner of Patents and Trademarks